United States Patent [19]

Jenkins et al.

[11] Patent Number: 4,605,721

[45] Date of Patent: Aug. 12, 1986

[54] NOVEL GRAFT COPOLYMERS AND PROCESS FOR THE PREPARATION THEREOF

[75] Inventors: Waylon L. Jenkins; James M. Hawkins, both of Kingsport; I. Daniel Sand, Jonesborough, all of Tenn.

[73] Assignee: Eastman Kodak Company, Rochester, N.Y.

[21] Appl. No.: 725,186

[22] Filed: Apr. 19, 1985

Related U.S. Application Data

[63] Continuation-in-part of Ser. No. 605,341, Apr. 30, 1984, abandoned.

[51] Int. Cl.$^4$ .................... C08G 81/00; C08G 83/00
[52] U.S. Cl. ............................ 527/312; 527/313; 527/314; 527/315
[58] Field of Search ............... 527/312, 313, 314, 315; 536/63, 64, 65, 66

[56] References Cited

U.S. PATENT DOCUMENTS

| | | | |
|---|---|---|---|
| 3,138,564 | 6/1964 | Borunsky | 527/314 |
| 4,134,809 | 1/1979 | Pacifici et al. | 527/315 |

*Primary Examiner*—John Kight
*Assistant Examiner*—Nathan M. Nutter
*Attorney, Agent, or Firm*—Donald W. Spurrell; J. Frederick Thomsen

[57] ABSTRACT

The present invention relates to novel graft copolymers and to a novel process for the preparation thereof. The polymeric compositions provided by the present invention comprise the reaction product of an ethylenically unsaturated monomer and a carboxylated cellulose ester having an acid number of at least about 5, an inherent viscosity of from about 0.01 to about 1.00 and wherein the anhydroglucose units thereof have ring substituents comprising by weight based on total polymer weight, of from about 0.05 to about 20% hydroxyl groups, from about 0.5 to about 44% acetyl groups, from 0 to about 54% butyryl groups, from 0 to about 47% propionyl groups, from about 0.4 to about 4.0% total carboxyl groups wherein from about 20% to about 100% of these carboxyl groups are non-saponifiable backbone, and wherein the material has a lactone level of from about $4.52 \times 10^{-15}$ to about $6.13 \times 10^{-4}$. Preferred carboxylated cellulose esters include carboxylated cellulose acetate, carboxylated cellulose acetate propionate, carboxylated cellulose acetate butyrate, and mixtures thereof. Preferred ethylenically unsaturated monomers include acrylic monomers, such as acrylic acid, methacrylic acid, acrylic acid esters, methacrylic acid esters, etc., acrylamides, methacrylamides, and vinyl monomers, such as vinyl aromatic compounds (e.g., styrene, divinylbenzene vinyltoluene, vinylnaphthalene, etc.), vinyl acetate, vinyl chloride, vinyl bromide, vinylidene chloride, vinylidene fluoride, tetrafluoroethylene, etc. The process of the present invention comprises reacting an ethylenically unsaturated monomer and a carboxylated cellulose ester at polymerization temperature (e.g., about 10° to 250° C.) in the substantial absence of an additional initiator.

52 Claims, No Drawings

NOVEL GRAFT COPOLYMERS AND PROCESS FOR THE PREPARATION THEREOF

This is a continuation-in-part application of Application Ser. No. 605,341, filed Apr. 30, 1984 and now abandoned.

The present invention relates to a novel class of polymeric compositions of matter and to a novel process for the preparation thereof. More specifically, the polymeric materials of this new class comprise the reaction product of an ethylenically unsaturated monomer and a carboxylated cellulose ester.

It is known in the art that various cellulose derivatives, such as cellulose esters (e.g., cellulose acetate butyrate) can be employed to advantage in paints and other coating compositions. A particular type of coating composition which has been found to be especially useful comprises a blend of a film-forming polymeric material (e.g., one or more acrylic polymers or copolymers) with a cellulose ester, such as cellulose acetate butyrate and a cross-linking agent, such as an isocyanate, melamine, etc. However, due to the relatively poor compatibility of cellulose esters with the other components of the composition, the concentration of cellulose ester in the composition is limited to amounts of about 10 to 15% by weight, and relatively large quantities of solvent are required. See, e.g., U.S. Pat. No. 3,639,147. Carboxylated cellulose esters have also been employed to advantage in such blended coating systems and have been found to impart surprising and unexpected properties thereto. See, for example, U.S. patent application Ser. No. 581,014, filed Feb. 17, 1984.

In an effort to overcome the deficiencies of prior art compositions which employ ordinary cellulose esters, copolymers of cellulose acetate butyrate and a vinyl monomer mixture have been employed in coating compositions. See, for example, Japanese Patent No. 57-85862. This publication discloses a copolymer of 10 to 30 weight percent cellulose acetate butyrate with a vinyl monomer so as to form a copolymer which is employed in an amount of about 20 to 40% by weight in a suitable solvent in the formation of a coating composition. The coating composition preferably additionally comprises 5 to 35% by weight styrene. By the use of a cellulose ester/vinyl copolymer, the compatibility of the cellulose ester with the film-forming resin (specifically, low molecular weight acrylics, styrene, etc.) is improved. However, this reference does not in any way refer to a carboxylated cellulose ester having low molecular weight and high carboxyl content. Moreover, the copolymer is prepared in the presence of an added free radical initiator, such as a hydroperoxide or peroxide.

In contrast to these teachings of the prior art, it has now been found that copolymeric compositions having useful properties can be prepared from ethylenically unsaturated monomers and the new class of cellulose derivatives known as carboxylated cellulose esters. The novel copolymers of the present invention typically exhibit a higher degree of grafting than prior art compositions, thereby providing more flexibility in the concentrations of the cellulose derivative which can be employed. These compositions and their improved properties were hitherto unknown in the art. Moreover, the novel compositions of the present invention can be prepared by a new free radical polymerization process which does not require the addition of initiators such as peroxides, etc.

SUMMARY OF THE INVENTION

In one aspect of the present invention there is provided a novel polymeric composition of matter comprising the reaction product of an ethylenically unsaturated monomer and a carboxylated cellulose ester.

In another aspect of the present invention there is provided a novel process for preparing graft copolymers. The process comprises reacting an ethylenically unsaturated monomer and a carboxylated cellulose ester at polymerization temperature in the substantial absence of an additional initiator.

DETAILED DESCRIPTION OF THE INVENTION

The present invention relates to novel graft copolymers and a process for the preparation thereof. The copolymers comprise the reaction product of an ethylenically unsaturated monomer and a carboxylated cellulose ester. The ethylenically unsaturated monomers which are suitable for use in the present invention include those which contain a moiety of the following formula

and which undergo free radical polymerization. More specifically, the ethylenically unsaturated monomer may comprise an olefin, an acrylic monomer, an acrylamide, a methacrylamide, acrylonitrile, a vinyl-substituted heterocyclic compound, a vinyl monomer, or a mixture thereof.

Olefins which are useful in the composition of the present invention include ethylenically unsaturated aliphatic hydrocarbons which can be subjected to free radical polymerization. Such monomers are well known in the art and include, for example, ethylene, propylene, 1,3-butadiene, isoprene, etc.

Acrylic monomers which are useful in the present invention will generally be of the following formula

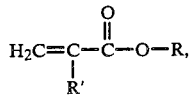

wherein R represents hydrogen or a lower alkyl group having up to about 12 carbon atoms and R' represents hydrogen or methyl. Specific monomers of this type include acrylic acid, methacrylic acid, methyl acrylate, ethyl acrylate, hydroxyethyl acrylate, phenoxyethyl acrylate, propyl acrylate, butyl acrylate, 2-ethylhexyl acrylate, glycidyl acrylate, ethylene glycol diacrylate, diethylene glycol diacrylate, 1,6-hexanediol diacrylate, trimethylolpropane triacrylate, pentaerythritol triacrylate, pentaerythritol tetraacrylate, methyl methacrylate, ethyl methacrylate, hydroxyethyl methacrylate, dimethylaminoethyl methacrylate, propyl methacrylate, butyl methacrylate, 2-ethylhexyl methacrylate, glycidyl methacrylate, ethylene glycol dimethacrylate, diethylene glycol dimethacrylate, triethylene glycol dimethacrylate, tetraethylene glycol dimethacrylate, trimethylolpropane trimethacrylate, bisphenol "A" dimethacrylate, mixtures thereof, etc. Preferred acrylic monomers are acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, and mixtures thereof.

The ethylenically unsaturated monomer may further comprise an acrylamide or a methacrylamide. Such monomers are also well known in the art and include such specific compounds as acrylamide, methacrylamide, N-methylacrylamide, N-ethylacrylamide, N-isopropylacrylamide, diacetone acrylamide, N-methylol acrylamide, the corresponding methacrylamides, etc. Acrylonitrile also is suitable for use as an ethylenically unsaturated monomer.

The ethylenically unsaturated monomer also may comprise a vinyl-substituted heterocyclic compound. Examples of such monomers include vinylpyridine, 1-vinyl-2-pyrrolidinone, etc.

Other vinyl monomers can also be used to advantage in the present invention. As used herein, the term "vinyl monomer" denotes ethylenically unsaturated monomers the polymerization of which is initiated by the generation of free radicals and which have not been listed in more specific categories above. Such monomers include, for example, vinyl aromatics (e.g., styrene, divinylbenzene, vinyltoluene, vinylnaphthalene, etc.), vinyl acetate, vinyl chloride, vinyl bromide, vinylidene chloride, vinylidene fluoride, tetrafluoroethylene, mixtures thereof, etc.

Ethylenically unsaturated monomers which are preferred for use in the present invention include acrylic monomers, acrylamides, methacrylamides, and vinyl monomers, such as those listed above. The acrylic monomers are especially preferred.

The novel polymeric compositions of the present invention further comprise a carboxylated cellulose ester. Carboxylated cellulose esters comprise a new class of cellulosic materials which are described in detail in U.S. patent application Ser. No. 581,014, filed Feb. 17, 1984, and the continuation-in-part thereof Ser. No. 724,747 filed Apr. 18, 1985, the disclosures of which are incorporated herein by reference in their entirety. The carboxylated cellulose esters are manufactured by reacting ordinary cellulose esters with ozone. Specific cellulose esters which are useful in the preparation of carboxylated cellulose esters include cellulose acetate, cellulose propionate, cellulose butyrate, cellulose acetate butyrate, cellulose acetate propionate, mixtures thereof, etc. In the manufacture of carboxylated cellulose esters, the cellulose ester starting material is provided to a reaction zone in a form which is suitable for reaction with ozone. For example, it is possible to provide the cellulose ester in the form of a solution in an appropriate solvent (i.e., one in which both the cellulose ester starting material and the carboxylated cellulose ester product are soluble), as an aqueous slurry, or, preferably, in a solid particulate form. More preferably, the cellulose ester is provided in the form of a powder. In the reaction zone, the cellulose ester is intimately contacted with a gaseous stream comprising ozone. Most preferably, the gaseous stream containing ozone is passed through a distributor plate and through a cellulose ester powder so as to create a fluidized solid. The gaseous stream preferably comprises at least about 0.25 weight percent ozone, based upon the total weight of gas present in the reaction system. The reaction is conducted at a temperature of about 25° to 80° C. (preferably about 50° to 75° C.). The cellulose ester is reacted with the ozone for a period of time sufficient to yield a carboxylated cellulose ester product. Commonly, desirable products are obtained by reacting the cellulose ester starting material with ozone for a period of time of at least about 0.5 hour.

Typically, desirable carboxylated cellulose ester products have an acid number of at least about 5. Preferably, the acid number of the carboxylated cellulose ester is about 10 to 35 (e.g., about 15 to 30). The carboxylated cellulose ester product may be characterized further by determining indirectly the molecular weight of the product, e.g., by inherent viscosity. The carboxylated cellulose ester product exhibits an inherent viscosity of about 0.01 to 1.00 (preferably, about 0.05 to 0.5).

The present preferred carboxylated cellulose esters including the acetates, butyrates and propionates are all hereinafter termed XAE and are defined as polymeric chains of anhydroglucose units having ring substituents comprising by weight based on total polymer weight, from about 0.05 to about 20% hydroxyl groups, from about 0.5 to about 44% acetyl groups, from 0 to about 54% butyryl groups, from 0 to about 47% propionyl groups, from about 0.4 to about 4.0% total carboxyl groups (terms include water soluble or water dispersible salts thereof) wherein from about 20% to 100%, preferably from about 30% to 100% of these carboxyl groups are non-saponifiable backbone (BBC), i.e., attached at their $\alpha$-carbons directly to the anhydroglucose rings, and wherein the XAE contains from about $4.52 \times 10^{-5}$ to about $6.13 \times 10^{-4}$ moles of lactone moiety per gram of XAE, hereinafter termed "lactone level". In general, the XAE is further characterized as having an acid number (AN) from about 5 to about 50, a DP/COOH of from about 5 to about 80, and an I.V. (inherent viscosity) of from about 0.07 to about 0.45.

For certain end uses, such as, in free-radical curable coatings, it is highly preferred that the XAE contain stable (relatively) peroxide groups in concentrations of from about 0.05 to about 2.0 meq of —O—O— per gram of XAE, hereinafter termed "peroxide value". Also, for certain uses given below, the preferred XAE materials have I.V.'s of from about 0.10 to about 0.30, a lactone level of from about $9.68 \times 10^{-5}$ to about $3.22 \times 10^{-4}$, a peroxide value of from about 0.10 to about 0.8, a DP:COOH from about 8 to about 25, and a Hoeppler viscosity reduction factor, hereinafter termed "HVR" and defined below, of 0.01 to 0.95, most preferably from about 0.6 to about 0.95. For general coatings applications the preferred constituent ranges for such XAE material comprise in weight percent:

| Acetyl | 35–44 |
| Propionyl | <1% |
| Butyryl | <1% |
| Hydroxyl | 4–20 |
| Total COOH | 0.5–2.5; |
| for automotive finishes | |
| Acetyl | 10–15 |
| Propionyl | 0–4 |
| Butyryl | 30–40 |
| Hydroxyl | 0.5–2.5 |
| Total COOH | 0.7–2.5; and |
| for printing inks | |
| Acetyl | 1.0–4.0 |
| Propionyl | 40–47 |
| Butyryl | 0.0–2.0 |

| | -continued | |
|---|---|---|
| Hydroxyl | 1.0–2.5 | |
| Total COOH | 0.5–2.5 | |

With respect to the above characterizations of the present XAE regarding degree of polymerization (DP), and ester content (acetyl, propionyl, butyryl), see pages 118–143 of Kirk-Othmer, "Encyclopedia of chemical Technology," 3rd Ed., Vol. 5, and the cited references, particularly 111 to 130, on page 141 thereof for methods for their determination.

The inherent viscosities (I.V.) are determined according to ASTM D2857-70 procedure in a Wagner Viscometer of Lab Glass Inc. of Vineland, N.J. having a ½ ml. capillary bulb, using a polymer concentration of 0.5% by weight in 60/40 by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. ($\eta$) is calculated from the equation $$(\eta)_{0.50\%}^{25°\,C.} = \frac{\ln \frac{t_s}{t_o}}{C}$$

where:
- ($\eta$) = Inherent viscosity at 25° C. at a polymer concentration of 0.5 g./100 ml. of solvent;
- ln = Natural logarithm;
- $t_s$ = Sample flow time;
- $t_o$ = Solvent-blank flow time; and
- C = Concentration of polymer in grams per 100 ml. of solvent = 0.50.

The total carboxyl group content of XAE (backbone and extra-pendant, i.e., non-backbone) is best determined by weak base potentiometric titration using a Brinkmann 636/100 Titoprocessor and Program with E635 Dosimat and Exchange Unit using a Senorex ® combination electrode or equivalent. In this method the XAE sample is dissolved in dimethylsulfoxide (DMSO) and titrated potentiometrically with standarized tetramethylguanidine (TMG) in isopropanol. The Titoprocessor controls the delivery of the titrant and provides a plotted curve of potential versus titrant volume. From an automatically determined end point, the Titoprocessor calculates the acid number "AN" and prints it with other parameters of the titration. The calculation is performed by the Titoprocessor on the following titration data
- E1 = ml. of titrant at end point,
- C1 = Factor for converting moles of acid/g. of XAE to mg. of KOH/g. of XAE,
- C2 = Normality of titrant,
- C3 = Blank titration in ml. of titrant at end point, and
- W = Sample weight.

The equation for the calculation is $$AN = \frac{(E1 - C3) \times C2 \times C1}{W}.$$

Typical and actual values for these data and the actual AN calculation for an XAE sample is as follows:

$$AN = \frac{\overset{E1}{(3.171} - \overset{C3}{0.0)} \times \overset{C2}{(0.1090)} \times \overset{C1}{(56.100)}}{\underset{W}{0.8181}} = 23.70;$$

This acid number corresponds to 1.90 wt. % total carboxyl group content in the XAE sample calculated as follows:

Wt. % COOH =

$$\frac{45 \text{ g/mole COOH} \times 100\% \times AN}{56100 \text{ mg/mole KOH}} = (0.0802) \times 23.70 = 1.90$$

The weight % of non-saponifiable backbone carboxyl groups (BBC) is determined by (1) strong base saponification of XAE to eliminate extra-pendant carboxyl groups which may be formed, for example, on the alkyl moieties of the pendant ester groups, (2) reacidification to neutrality, (3) neutralization of the backbone carboxyl groups with barium o-nitrophenolate, (4) analysis for barium content, and (5) calculation of backbone carboxyl content therefrom. An example of this procedure is as follows:

Preparation of Barium o-Nitrophenolate (Reagent A) Stock Solution

Heat 3 l. of distilled water in a 4-l. flask to 75° C. on a steam bath. Add 16.67 g. of barium hydroxide, [Ba(OH)$_2$.8H$_2$O] and 21.67 g. of o-nitrophenol. Stir vigorously for 1 hour at 75° C. and let stand overnight at room temperature. Decant to another flask, heat to 75° C., add 4.17 g. of o-nitrophenol, stir and let stand overnight at room temperature. Decant and filter on a Buchner funnel through Whatman No. 4 paper and adjust the filtrate to 3 l. with distilled water.

Saponification of XAE

100 Grams of XAE is dissolved in 300 g. of methanol and added to 1.0 kg of 5 wt. % aqueous NaOH dropwise with stirring over a 2-hour period at room temperature. The resulting suspended precipitate is stirred for 18 hours at room temperature, the precipitate washed to neutrality on a fritted Buchner funnel with deionized water, and the water pulled off from the precipitate to form a cake.

Reacidification

The cake is suspended in 1.0 liter of 0.1N aqueous HCl at room temperature for 4 hours, the solids collected on a Buchner funnel, washed to neutrality with deionized water, the water pulled off from the solids to form a cake, and the cake crushed in an evaporating dish and dried in a convection oven at 50° C. for 18 hours.

Neutralization of BBC

Place 1 to 2 grams of the crushed reacidified cake, measured to the nearest 0.01 g., in a clean 32 oz. wide-mouth jar to provide the experimental sample. An equal amount of Avicell PH101 microcrystalline cellulose is put in a second clean 32 oz. wide-mouth jar to provide the control sample. To each sample jar is added 600 ml. of deionized water and 50 g. of reagent A, the closed jars rolled at room temperature for 24 hours, and the suspensions filtered into clean, dry 125 ml filter flasks.

Analysis for Barium (Ba)

The filtrate of each sample is analyzed for Ba by inductively coupled plasma-optical emission spectroscopy using a Perkin-Elmer ICP/5500 spectrometer.

Calculation of BBC

Wt. % of backbone carboxyl groups for each sample based on the sample weight is calculated from the equation $$BBC = (4.26 \times 10^{-2}) \frac{(Ba_c - Ba_x)}{S}$$

where
- $Ba_c$ is the concentration (ppm) of Ba in the control sample filtrate;
- $Ba_x$ is the concentration (ppm) of Ba in the experimental sample filtrate; and
- S is the sample weight in grams.

The following is an exemplary calculation wherein:
$Ba_c = 183$ ppm;
$Ba_x = 136$ ppm; and
$S = 2.00$ g.

$$BBC = (4.26 \times 10^{-2}) \frac{(183 - 136)}{2.00} = 1.00 \text{ wt. \%}$$

The minimum % of backbone carboxyl in a sample is calculated as $$\left[ \frac{\frac{BBC}{100 \times \text{Total COOH}}}{\left( 100 - W\alpha + \frac{W\alpha}{MW\alpha} - W\phi + \frac{W\phi}{MW\phi} - W\beta + \frac{W\beta}{MW\beta} \right)} \right] \times 100\%$$

where:
- BBC is the wt % of backbone carboxyl group as calculated above;
- total COOH is the wt % COOH calculated from the acid number obtained by weak base titration;
- $W\alpha$ is the wt % acetyl;
- $MW\alpha$ is the molecular weight of the acetyl moiety = 43 g/mole of acetyl;
- $W\phi$ is the wt % propionyl;
- $MW\phi$ is the molecular weight of the propionyl moiety = 57 g/mole of propionyl;
- $W\beta$ is the wt % butyryl; and
- $MW\beta$ is the molecular weight of the butyryl moiety = 71 g/mole of butyryl.

Since the total COOH in this example is 1.9% (data given above) and the wt % BBC is 1.00, the minimum % of backbone carboxyl in the sample is equal to $$\frac{\frac{1.00 \times 100\%}{100 \times 1.9}}{\left[ \left( 100 - 11 + \frac{11}{43} - 0.2 + \frac{0.2}{57} - 33 + \frac{33}{71} \right) \right]} = 30\%$$

The conversion factor $4.26 \times 10^{-2}$ employed in the above calculation is derived as follows:

$$\frac{2 \times 45 \text{ g/mole (COOH)} \times 0.65 \text{ 1} \times 1000 \text{ ml/1} \times 10^{-6} \text{ (ppm)}^{-1} \times 100\%}{137.3 \text{ g/mole } Ba} = 4.26 \times 10^{-2}.$$

The peroxide —O—O— values or functionality of the preferred XAE can reside in the polymer at more than one possible location and in different chemical associations with the XAE rings and pendant groups. The essential aspect is that the peroxide values represent actual —O—O— functionality, that they be measurable as such by techniques known to the art, and that they be useful, for example, in the free-radical initiation of curable coatings into which the XAE is compounded.

A typical species of anhydroglucose unit residue in which —O—O— moieties are found, as evidenced by polarography has the structure

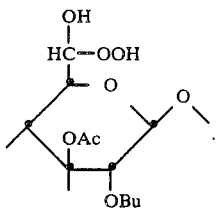

These peroxide groups in general in the XAE are considered quite stable by comparison, e.g., to t-butyl peroxypivalate, a commercially available free radical initiator which decomposes exothermically upon heat initiation. The present XAE, on the other hand, retains substantial peroxide functionality, even during the viscosity reduction stage of the present process. These moieties are formed during ozonolysis. This phenomenon does not occur in other reactions of cellulosics such as carboxylation thereof by esterification, as in making cellulose acetate phthalate, or by etherification, as in making carboxymethyl cellulose, and no useful peroxide values appear to result from those processes. For those cellulosics carboxylated by peroxide-initiated grafting, any peroxide introduced is apparently destroyed in the grafting process.

In the present invention, the molar ratio of total peroxide, —O—O—, to total carboxylic acid, COOH, is approximately 2.2 for XAE in the acid number range from 5 to 50, prior to any post-ozonolytic processing. Treatment of XAE, other than storage at low temperature, may alter the peroxide level through decomposition thereof. The post-ozonolytic treatments of the present invention, however, will not take this ratio to less than 1 so that the finished XAE will have an equivalent ratio of peroxide to carboxylic acid of greater than 1 and less than or equal to approximately 2.2.

The peroxide values in meq. of —O—O— per gram of XAE are determined by reacting an excess of sodium iodide with the XAE sample in 1/1 by weight, acetic acid/methylene chloride for 30 minutes. Water is added and the liberated iodine is titrated with sodium thiosulfate to a starch end point. The equation for the calculation is $$\text{Peroxide Value} = \frac{(S - B) \times N}{W}$$

wherein:
S=mL Na$_2$S$_2$O$_3$ used to titrate sample;
B=mL Na$_2$S$_2$O$_3$ used to titrate blank;
N=normality of the Na$_2$S$_2$O$_3$; and
W=sample weight in grams.

The lactone moiety formation is unique to the present cellulose ester carboxylation and these moieties are contained in anhydroglucose residue units of the structures typified for example, by

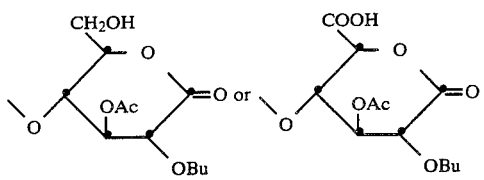

resulting from chain cleavage during ozonolysis and/or viscosity reduction. The lactone content is determined by subtracting the total carboxyl content of an XAE sample determined by weak base (Brinkmann) titration from the total carboxyl content of the same sample determined by strong base titration. The strong base opens the lactone by hydrolysis to give the —COO$^-$ anion. The weak base titration is described in detail above. The strong base titration is as follows:

An XAE sample weighing from 0.25 g. to 0.60 g. measured to the nearest (0.005 g.) on a Mettler PC balance is added to 150 g.±1 g. of a solvent consisting of 90 wt. % methylene chloride and 10 wt. % methanol, and allowed to dissolve at room temperature with magnetic stirring. The solution is made 5±2 micromolar in phenolphthalein and titrated with an ethanolic KOH solution having a normality known to the nearest 0.001 N in the range of 0.1 N±0.01 N. The titration is performed by adding the titrant dropwise from a 25 ml. buret (Labglass, Inc.) to the solution being magnetically stirred at room temperature until a pink endpoint is obtained. The volume of titrant is measured to the nearest 0.05 ml. and the acid number AN is calculated from the equation $$AN = \frac{N \times ml \times 56.1 \text{ g/mole KOH}}{w}$$

where
N=Normality of KOH,
ml=ml of titrant, and
w=wt. of XAE sample in grams.

A typical lactone level in moles of lactone moiety per gram of XAE is calculated as follows;

$L =$ moles of lactone moiety per gram of XAE, $$L = \frac{\Delta AN}{56100 \text{ mg/mole KOH}}, \text{ and wherein } \Delta AN =$$

(AN by strong base titration) −
(AN by weak base titration).
Example calculation

| | |
|---|---|
| AN by strong base titration | 22.1 |
| AN by weak base titration | 13.3 |

$$L = \frac{(22.1 - 13.3)}{56100} = 1.57 \times 10^{-4}$$

An important distinguishing characteristic of the present XAE material and one which contributes to its excellent automotive finish utility is its unusual reduction in solution viscosity with time as determined by the Hoeppler method defined below and given the designation herein of HVR, as previously mentioned. Typically, within the range of initial Hoeppler viscosity in centipoises (cps) of from about 20 to about 20,000 cps, a decrease in viscosity of the XAE solution in n-butylacetate/n-butyl alcohol, 85/15, wt/wt to 65–95% of the initial value normally occurs in about 24 hours at 80° C. This phenomenon is highly unusual since other cellulose esters experience little if any decrease in such viscosity, and usually show a slight increase with the passage of time. For the present XAE material in general, an initial Hoeppler viscosity of from about 10 to about 200 centipoises is preferred.

The Hoeppler viscosity method is based on the principle that viscosity may be measured by the time required for a standardized ball to roll down an inclined tube filled with the cellulose ester solution. The ball size is selected according to the initial viscosity to require sufficient time for it to pass between two reference marks for accuracy; not less than 20 nor more than 300 seconds. The larger the ball, the greater is the time required.

The Hoeppler Viscometer or Haake Falling-Ball Viscometer is distributed by several laboratory supply houses including PolyScience Corporation, 909 Pitner Ave., Evanston, Ill. It consists of a precision bore glass tube approximately ⅝-inches in internal diameter and 8½ inches in length with brass fittings and rubber gaskets on each end for stoppers, and a dropping funnel in the top. Reference marks are 10 cm apart in the mid-section. This tube is mounted in a glass water jacket approximately 3¼ inches in diameter and 7½ inches in length. The jacket is provided with a thermometer so placed that it may be read in the water, and is also provided with inlet and outlet fittings for circulating constant temperature water through the jacket and around the tube. The jacket and tube are mounted on a rigid frame fastened to a base provided with leveling screws and a leveling device so that when the base is level, the jacket and tube are inclined at exactly fifteen degrees.

The instrument is equipped with several standardized balls, some glass, some gold plated, and some steel. These balls vary in size and specific gravity and cover a wide range of viscosities, the glass balls having a low specific gravity and being used for very low viscosity liquids. The gold-plated balls and larger steel balls are for higher viscosity liquids, and the smaller steel balls for still higher viscosity liquids. Each ball has been accurately standardized with a constant "K" for the tube by the manufacturer. This constant and the factors in the following formula are used in the conversion of seconds to centipoises.

The Hoeppler viscosity N in centipoises (cps) is determined for the present XAE using a 20% by wt. solution of the XAE sample in a solvent consisting of an 85/15 weight ratio of n-butyl acetate/n-butyl alcohol, and is calculated from the equation $$N = T(S - D) K$$

wherein:

T=time in seconds for the ball to pass between the reference marks in the sample;
S=specific gravity of ball used;
D=density of XAE sample solution at temperature of determination; and
K=tube constant for the particular ball used.

The actual K value for the steel ball used in determining the Hoeppler viscosity of the XAE samples given below was determined using S-60 oil of known viscosity (101.1 cps). The ball had a weight of 16.238 g., a density of 8.146, and a micrometer measured diameter of 1.562 cm. The calculation of K according to the above equation was as follows:

$$N \quad T \quad S \quad D$$
$$101.1 = 185.6 \, (8.146 - 0.8638) \, K$$
$$K = 0.0748$$

Hoeppler Viscosity Determination

Two test samples of the same XAE material were prepared (20% solution by weight) by weighing 30.0 g±0.1 g of the XAE material and 120.0 g±0.1 g of the 85/15 (w/w) of n-butyl acetate/n-butyl alcohol solvent for each sample into a 8.0 oz, wide mouth, screw cap bottle. The bottles were then placed on a Burrell (Technical Supply Co.) Wrist Action Shaker using the high setting. Each sample was kept on the shaker for 45 min. and then placed in a constant temperature bath maintained at 25° C.±0.02° C. for 30 min. A density of 0.8912 for each of the 20% solution samples was determined using a standard type straight tube viscous liquid pycnometer. Each sample was then placed into the Hoeppler Viscometer and run immediately. The time, in seconds, was recorded and calculations made. The Hoeppler viscosity was calculated to be 39 centipoises (cps) for both samples.

In another aspect of the present invention there is provided a uniquely effective process for the preparation of the above described carboxylated cellulose ester material. In a most preferred embodiment of this process, cellulose ester starting material is provided in a special reaction system and is reacted therein under special conditions with ozone, and thereafter is specially treated in a closed loop system to reduce solution viscosity.

This novel and most preferred process, hereinafter referred to as the "dry" process, comprises contacting at from about 50° to about 75° C., cellulose ester material with ozone fed to a fluidized bed reactor for a sufficient period to carboxylate said material, converting said reactor to a closed loop system wherein the ozone feed is terminated, recirculating the gasses present in said system at from about 70° C. to about 95° C. and adding a volatile organic acid thereto in vapor form to a concentration of from about 0.2% to about 2.2% by weight of the initial ester material charge, continuing said recirculation until the Hoeppler viscosity of the carboxylated material is between 20 and 200 cps., and purging the system at elevated temperatures until the total free acid content is < about 0.5% by weight of said material charge.

In the viscosity reduction step which begins immediately after ozonolysis with no intervening processing, the bed no longer is fluidized with an ozone-containing gas stream but instead is fluidized with a recirculating gas stream (VR) comprised mainly of air or air diluted with an inert gas such that the oxygen concentration is less than about 21 wt. % thereof. Mechanical agitation of the bed during both ozonolysis and viscosity reduction for certain of the XAE material is desirable. The temperature of the bed, for the viscosity reduction, is raised to between about 75° C. and 95° C. depending on the acid number of the product being processed. The gas flow provided by the blower in the VR stream is 20 SCFM to 30 SCFM. A volatile organic acid, preferably acetic acid, is added to the VR stream by vaporizing the acid thereinto with a vaporizer. The total amount of volatile organic acid added is in the range from 0.2 wt. % to 2.2 wt. % of the carboxylated material depending on the acid number desired for the product. This step is continued until the XAE reaches a specified Hoeppler viscosity in the range from about 20 cps to about 200 cps depending on the desired acid number. After the target viscosity is reached, the volatile acids are stripped by discontinuing recirculation, venting the reactor, and fluidizing the bed with fresh air or fresh air diluted with an inert gas, again such that the oxygen concentration is in the range from 0 wt. % to 21 wt. %. The flow rate of the fresh gas into and out of the reactor ranges from 20 SCFM to 40 SCFM. After leaving the reactor, the gas stream is scrubbed to remove pollutants and then vented. The temperature of the bed may be maintained at the same temperature which was established for viscosity reduction. The stripping process is continued until the total level of the volatile organic acids such as formic, acetic, propionic or butyric is less than about 2000 ppm of the XAE by weight.

It is most preferred in the ozonolysis section of this process that (1) the water content of the starting cellulose ester be < about 4.0 wt. %, (2) the fluidizing stream contains from about 1.0 to about 3.0 wt. % ozone, (3) the temperature be from about 50° C. to about 75° C., and (4) the ozone contact time be from about 4 to about 10 hours. The low moisture content in the reactor bed and of the starting material is very important for the reproducible control of the ozonolysis and for obtaining optimum carboxylation rate. The fact that the reactor bed is fluidized instead of stationary aids in ensuring a uniform product and allows for more efficient utilization of the ozone. Conversely a stationary bed would not work satisfactorily for making the preferred XAE as evidenced by the fact that whenever fluidization of the bed is lost during ozonolysis, an intractable and unusable lump forms. It is particularly noted that in the viscosity reduction step the concentrated solution viscosity (Hoeppler) markedly reduces without any attendant and uncontrolled increase or decrease in carboxyl content. This phenomenon is very important to achieving reproducibility of product of predeterminable chemical composition and properties. The particular manner in which this step is carried out in the present process has several advantages over water digestion including higher yield, XAE is not lost in the water, drying is obviated, restabilization is obviated since typically used anti-hydrolysis agents, e.g., K-acid citrate is not washed out in the water digestion, less waste removal and all steps in the process are carried out in the same vessel which effects large capital savings.

Example of the Production of XAE by the "Dry" Process

Referring to FIG. 1, 300 pounds of finely powered CAB are charged to the fluid-bed reactor. The bed is fluidized with air at a flow rate of 24 SCFM and the bed temperature is brought to 60° C. Ozonolysis is performed with a stream of air from 34 at 20° C. containing 2 wt % ozone. During ozonolysis, the bed is agitated with the mechanical agitator 14 at 30 rpm. The duration of ozonolysis is 11 hours. At the end of the reaction time, the fluidizing gas is changed from 2 wt % ozone in air to a closed loop, recirculating gas stream VR without added ozone. The recycle blower 28 recirculates the gas through the ester bed at 24 SCFM and the bed temperature is raised to 80° C. Acetic acid is vaporized from 32 into the VR stream until the total amount of acetic acid added thereto is 0.8 wt % of the ester charge. Throughout the fluidization, agitation is maintained at 30 rpm. The recirculation at 80° C. is continued until the Hoeppler viscosity of the material is less than 40 cps. At this point, the recycle blower 28 is shut down and a fresh air stream from 34 is passed through the fluidized bed at 80° C. and 30 SCFM and vented through scrubber 42. The fluidization with fresh air is continued until the total free acid content is less than about 0.2 wt % of the ester charge. The XAE product is then cooled to 30° C. by reducing both the fresh air temperature and the reactor temperature and then discharged from the reactor through valve 20 into drums.

The polymeric compositions of the present invention comprise at least about 5% by weight, based upon the total weight of the composition, of a carboxylated cellulose ester (e.g., about 5 to 95% by weight). Preferably, the carboxylated cellulose ester is present in an amount of about 25 to 75% by weight (e.g., about 50% by weight). Of course, it is conceivable also to employ the carboxylated cellulose ester solely as a polymeric initiator. Such a function would require significantly smaller quantities of the carboxylated cellulose ester, i.e., on the order of 0.1 to 2 weight percent (e.g., about 0.5 percent by weight).

Carboxylated cellulose esters which are useful in the present invention include carboxylated cellulose acetate, carboxylated cellulose propionate, carboxylated cellulose butyrate, carboxylated cellulose acetate propionate, carboxylated cellulose acetate butyrate, mixtures thereof, etc. Preferred carboxylated cellulose esters include carboxylated cellulose acetate, carboxylated cellulose acetate propionate, carboxylated cellulose acetate butyrate, mixtures thereof, etc. Carboxylated cellulose acetate butyrate is especially preferred for use in the present invention.

The polymeric compositions of the present invention may further comprise fillers, dyes, pigments, plasticizers, antioxidants, and/or stabilizers in suitable quantities, as is well known in the art.

The novel copolymeric compositions of matter of the present invention typically will exhibit an inherent viscosity of about 0.05 to 4.0. The inherent viscosity is determined by dissolving at 120° C. 0.5 g of the product in 100 ml of a mixture of phenol and tetrachloroethane having a phenol:tetrachloroethane weight ratio of 60:40 and then measuring the inherent viscosity of the solution at 25° C. Preferably, the I.V. of the copolymeric product will be in the range of about 0.1 to 2.0.

The novel copolymers of the present invention can be prepared by a unique process which comprises another aspect of the present invention. The novel process of the present invention comprises reacting an ethylenically unsaturated monomer and a carboxylated cellulose ester at polymerization temperature in the substantial absence of an additional initiator. The ethylenically unsaturated monomers and carboxylated cellulose esters have been described in detail above. The temperature at which polymerization is effected preferably is in the range of about 10° to 250° C., with a temperature of about 25° to 120° C. being preferred.

The ethylenically unsaturated monomer and the carboxylated cellulose ester to be copolymerized in accordance with the process of the present invention are provided to the reaction system in an amount such that the final polymer contains about 5 to 95 weight percent carboxylated cellulose ester. Typically, the reaction mixture comprises about 5 to 95 weight % carboxylated cellulose ester and correspondingly about 5 to 95 weight % ethylenically unsaturated monomer. Preferably, the reaction system comprises about 25 to 75% by weight (e.g., about 50% by weight) of a carboxylated cellulose ester and correspondingly about 25 to 75% by weight (e.g., about 50% by weight) of an ethylenically unsaturated monomer.

The copolymers described herein are prepared by the claimed process by heating a mixture of a carboxylated cellulose ester with an unsaturated monomer or mixture of unsaturated monomers. As alternatives to thermal initiation, the peroxide groups may be activated and/or decomposed by chemical or photochemical means to initiate polymerization. Chemical activators (also known as promoters and/or accelerators) include inorganic reducing agents such as ferrous ion and organic reducing agents such as N,N-dimethylaniline or ascorbic acid. Also suitable as chemical activators are promoters which are based upon transition metals, such as cobalt, vanadium, manganese, chromium, etc. Especially useful are metal "soaps", such as vanadium naphthenate. When employed, such additives typically are present in an amount of about 1 to 10 ppm.

The rate of polymerization, molecular weight, and physical properties of the product are dependent upon the temperature at which the polymerization is carried out, the ratio of carboxylated cellulose ester to unsaturated monomer, the amount and type of solvent present (if any), and the degree of carboxylation of the carboxylated cellulose ester, among other factors.

The polymerization reaction can be conducted by means of any of a number of polymerization techniques which are known in the art. Such reaction types include bulk polymerizations, emulsion and suspension polymerizations, and solution polymerizations.

When the polymerization reaction is carried out by means of a bulk polymerization process, the reactants are mixed together in the reaction vessel in the liquid phase. The reaction vessel is then heated with stirring or other suitable agitation to polymerization temperature. As the exothermic polymerization proceeds, stirring or other suitable agitation is continued so as to disperse the heat of reaction throughout the reaction system. In order to avoid the problems of localized overheating during the later stages of reaction, the bulk polymerization can be terminated at relatively low conversions followed by removal of excess monomer by distillation. During polymerization, the polymer product remains soluble in the liquid monomer. Unlike ordinary bulk polymerization processes, the process of the present invention does not require the addition of initiator to the liquid starting material.

In solution polymerization, the reaction system includes a solvent in which the respective reactants and the copolymer product are soluble. The use of a solvent helps to avoid the overheating problems sometimes encountered with bulk polymerizations. Solvents which are suitable for use in the process of the present invention include any of the typical organic solvents in which the reactants and polymeric product(s) are soluble. Examples of such solvents include butyl acetate, acetone, methanol, and methylene chloride.

Emulsion or suspension polymerization techniques can also be employed in the process of the present invention. In this type of polymerization, the reactants are dispersed rather than dissolved in a reaction medium. In most cases, water is the preferred reaction medium. Again, this type of polymerization offers the advantage of being able to more easily dissipate the heat of reaction. Surface active agents are typically employed in emulsion polymerizations so as to stabilize the reactants and the polymer product particles in the reaction medium. Suitable surface active agents include those which are commonly employed in the art. Such well-known surface active agents include anionic surfactants, such as fatty acid soaps (e.g., sodium stearate), fatty acid sulfates (e.g., sodium lauryl sulfate), fatty acid sulfonates (e.g., sodium dodecylbenzene sulfonate), etc.; nonionic surfactants, such as poly(ethylene oxide), poly(vinyl alcohol), hydroxyethyl cellulose, etc.; and cationic surfactants, such as dodecylammonium chloride, cetyltrimethylammonium bromide, etc. In addition to surfactants, other known dispersants can be employed. Such well-known dispersants include water-soluble organic polymers, such as poly(vinyl alcohol), poly(acrylic acid), methyl cellulose, gelatin, etc., and water-insoluble inorganic materials, such as kaolin, magnesium silicates, aluminum hydroxide, etc.

In the process of the present invention, solution polymerizations have been found to be an especially effective means for carrying out the polymerization reaction. With the use of such a polymerization process, reaction temperatures of about 25° to 120° C. (e.g., about 50° to 80° C.) are suitable, and the polymerization reaction can be completed within a period of time of about 2 to 48 hours.

While not wishing to be limited in any way by theoretical considerations, it appears that the advantageous effects arising from the use of carboxylated cellulose esters in the novel copolymers of the present invention and in the process for preparing the same, as presently disclosed and claimed, may be due to the chemical structure of the carboxylated cellulose ester itself. In particular, it appears that peroxide groups are present upon the polymer backbone of the carboxylated cellulose ester. For example, a carboxylated cellulose acetate butyrate may contain approximately 0.5 milliequivalents of peroxide per gram of carboxylated cellulose ester (i.e., about 1 peroxide group per polymer molecule). It is believed that, during preparation of the polymer compositions of the present invention, these peroxide groups can function as free radical initiators, thereby alleviating the need for additional initiators, such as organic peroxides, etc.

Furthermore, it is believed that these peroxide groups enable the carboxylated cellulose ester to be grafted efficiently onto the ethylenically unsaturated monomer, thereby overcoming incompatibility problems inherent in prior art compositions. Specifically, it is believed that initiation occurs by decomposition of the peroxide present on the carboxylated cellulose ester and that grafting occurs as a result of this radical initiation. As a result, a higher degree of grafting is achieved than in compositions which employed prior art cellulosic derivatives, such as ordinary cellulose esters. Moreover, because the initiator is attached to the carboxylated cellulose ester starting material, improved grafting is contemplated as compared to the case wherein added initiator is used. In addition, the graft copolymerization process proceeds rapidly and efficiently.

Thus, the composition and process of the present invention provide unique advantages which arise from the incorporation of a carboxylated cellulose ester. These advantages were unforeseen at the time the present invention was made, especially in view of corresponding drawbacks accompanying the use of ordinary cellulose esters in analogous processes and compositions.

It is also possible to prepare the novel graft copolymers of the present invention by polymerizing one or more ethylenically unsaturated monomers in the presence of a carboxylated cellulose ester and an added initiator. In such a process, initiation is believed to occur by a combination of decomposition of the peroxide present on the carboxylated cellulose ester and the use of one or more free radical initiators, such as organic peroxides, inorganic peroxides, redox initiators, and azo compounds. Grafting occurs both as a result of radical initiation by the peroxide groups on the carboxylated cellulose ester and as a result of radicals generated on the carboxylated cellulose ester by chain transfer reactions. The relative contributions of these two processes will vary as a function of the ratio of added initiator to peroxide on the carboxylated cellulose ester, the reaction temperature, reaction solvent (if present), the particular radical initiator or initiators added, the type and proportions of ester groups on the carboxylated cellulose ester, the particular monomer or monomers used, and the relative amounts of monomer and carboxylated cellulose ester. These variables affect the relative amounts of homopolymers and graft copolymers, rate of polymerization, peroxide content after the graft reaction, and chain length of the grafted copolymer. Thus, these variables can be used to optimize properties for particular applications.

The novel graft copolymers of the present invention are useful in a wide range of applications including coatings, inks, adhesives, textile fibers, cigarette filter tow, flexible films, molding compounds, etc. This invention will be further illustrated by the following Examples although it will be understood that these Examples are included merely for purposes of illustration and are not intended to limit the scope of the invention.

EXAMPLE 1

This Example illustrates the preparation of a graft copolymer from a carboxylated cellulose acetate butyrate and ethyl acrylate in a butyl acetate solvent by the process of the present invention.

The carboxylated cellulose acetate butyrate starting material contained 14.2 weight percent acetyl groups, 0.57 weight percent propionyl groups, and 31.9 weight percent butyryl groups as the acyl functionalities. The acid number of the starting material was about 25, and the I.V. was approximately 0.15.

A mixture of 10 grams of the carboxylated cellulose acetate butyrate described above, 10 grams of ethyl acrylate, and 20 ml of butyl acetate was heated at 60° C. overnight. The reaction mixture did not contain any additional initiator. The resulting polymer product weighed 18.4 g and had an I.V. of 1.10. The polymer was soluble in acetone and was cast to form a clear, colorless film. Coatings of the polymer product applied from solution demonstrated good adhesion to maple wood, aluminum, stainless steel, polystyrene, and poly(methyl methacrylate).

COMPARATIVE EXAMPLE 1

This Example illustrates the results obtained when cellulose acetate butyrate is used in the procedure of Example 1 instead of the carboxylated cellulose acetate butyrate described therein. The cellulose acetate butyrate employed in the present Comparative Example exhibited an I.V. of 1.40.

The procedure of Example 1 was repeated except that the cellulose acetate butyrate described above was employed. Addition of the reaction mixture to hexane followed by washing and drying recovered 9.51 g of polymer. Thus, no weight gain in the polymeric starting material was observed, thereby indicating that virtually no graft polymerization occurred.

EXAMPLE 2

This Example illustrates the preparation of a graft copolymer of the present invention by the process of the present invention. A suspension polymerization technique was employed.

A mixture of 10 grams methyl methacrylate, 10 grams of the carboxylated cellulose acetate butyrate of Example 1, 20 ml of 2% poly(vinyl alcohol) (which was obtained commercially from Monsanto Corporation under the designation Gelvatol ® 20-90), and 40 ml water was tumbled overnight in a 7 oz. bottle at 60° C. Colorless beads were formed and were easily isolated. The I.V. of the washed and dried product was 0.62.

EXAMPLE 3

This Example illustrates the use of a mixture of acrylic monomers in the preparation of a graft copolymer of the present invention by the process of the present invention.

A mixture of 10.0 g of the carboxylated cellulose ester of Example 1, 6.0 g of methyl methacrylate, 1.0 g of butyl acrylate, 3.0 g of n-butyl methacrylate, and 20 ml of butyl acetate were tumbled overnight at 60° C. The copolymer which was recovered was colorless, weighed 18.8 g, and had an I.V. of 0.45.

EXAMPLE 4

This Example illustrates the wide range of proportions of carboxylated cellulose ester to vinyl monomer which may be used in the preparation of graft copolymers of the present invention. The carboxylated cellulose ester of Example 1 was reacted with various amounts of ethyl acrylate as shown in Table I. In all cases, polymerization occurred to produce high yields of polymer.

TABLE I

| Carboxylated Cellulose Acetate Butyrate | Ethyl Acrylate | Butyl Acetate | Temperature | % Yield | I.V. |
|---|---|---|---|---|---|
| 15.0 g | 5.0 g | 20 ml | 60° C. | 90 | 0.28 |
| 10.0 g | 10.0 g | 20 ml | 60° C. | 89 | 0.86 |
| 2.0 g | 18.0 g | 20 ml | 60° C. | 98 | 3.13 |
| 1.0 g | 19.0 g | 20 ml | 60° C. | 99 | 3.37 |

EXAMPLE 5

This Example illustrates the preparation of graft copolymers of the present invention by a process which involves the use of additional initiator.

A mixture of 10 g of the carboxylated cellulose acetate butyrate of Example 1, 10 g of ethyl acrylate, 20 ml of butyl acetate, and 0.15 g of lauroyl peroxide was heated to 60° C. After three hours, the solution was very viscous. After 21 hours, the mixture was added to hexane in order to precipitate the polymer product. After washing and drying, the product weighed 18.4 g and had an I.V. of 0.776. A clear, water-white polymer product was obtained.

EXAMPLE 6

This Example illustrates the preparation of a polymer composition from a carboxylated cellulose ester and butyl acrylate.

The procedure of Example 5 was repeated, employing butyl acrylate in place of ethyl acrylate. The resulting polymer was very thick and difficult to remove from the glass vessel. The weight of the recovered product was 13.3 g and the I.V. was 0.582. A clear polymer product was obtained.

EXAMPLE 7

This Example illustrates the use of methyl acrylate as the ethylenically unsaturated monomer in the procedure of Example 5. The resulting graft copolymer product weighed 19.9 g and had an I.V. of 0.853. A polymer product exhibiting only slight haziness was obtained.

COMPARATIVE EXAMPLES 1-3

These Comparative Examples illustrate the attempted preparation of graft copolymers from the ethylenically unsaturated monomers employed in Examples 5 through 7 by the procedure of Example 5. These Comparative Examples employed a conventional cellulose acetate butyrate containing 14% acetyl and 33% butyryl groups and which had an I.V. of 1.40. The results are given below in Table II.

TABLE II

| Run | Monomer | Yield (g.) | I.V. |
|---|---|---|---|
| Comp. Ex. 1 | ethyl acrylate | 20.0 | 1.547 |
| Comp. Ex. 2 | butyl acrylate | 14.3 | 1.134 |
| Comp. Ex. 3 | methyl acrylate | 18.6 | 1.915 |

In each of Comparative Examples 1-3, the polymer product was hazy in appearance. This result indicates poor compatibility between the cellulose ester and acrylic monomer and is also believed to indicate that only a relatively minor degree of grafting, if any, has occurred.

EXAMPLE 8

This Example illustrates the use of a carboxylated cellulose acetate propionate in the preparation of a graft copolymer of the present invention.

The carboxylated cellulose acetate propionate starting material contained 4 weight percent acetyl groups, 40 weight percent propionyl groups, and 0.562 milliequivalents of peroxide per gram of carboxylated cellulose acetate propionate. The starting material exhibited an I.V. of 0.12.

A mixture of 10 grams of the above-described carboxylated cellulose acetate propionate, 10 grams of ethyl acrylate, and 80 ml butyl acetate was maintained at 70° C. for 21 hours. The product was precipitated in hexane, washed, and dried. The product exhibited an I.V. of 0.42 and was obtained in a yield of 80%. Films cast from the polymer product were clear, colorless, and brittle.

EXAMPLE 9

This Example illustrates the preparation of graft copolymers of the present invention from a carboxylated cellulose acetate propionate having an acetyl content of 4%, a propionyl content of 40%, and a peroxide content of 0.378 milliequivalents of peroxide per gram of carboxylated cellulose acetate propionate. The carboxylated cellulose acetate propionate exhibited an I.V. of 0.19.

A graft copolymer was prepared in the manner described in Example 8 using the above-described carboxylated cellulose acetate propionate. A polymer product having an I.V. of 0.48 was obtained in a yield of 77%. Films cast from the product were clear, colorless, and brittle.

EXAMPLE 10

This Example illustrates the use of a carboxylated cellulose acetate in the preparation of graft copolymers according to the present invention. The carboxylated cellulose acetate starting material had an acetyl content of 32%, a peroxide content of 0.318 milliequivalents per gram, and an I.V. of 0.24.

A mixture of 10 grams of the above-described carboxylated cellulose acetate, 10 grams of ethyl acrylate, and 80 milliliters of acetone was heated at 70° C. for 21 hours. The product was obtained as a slurry. By NMR analysis, it was determined that carboxylated cellulose acetate was present both in the liquid phase and in the solid particles, but in differing proportions. The liquid phase was decanted and precipitated in hexane to yield 2 grams of a gummy product having an I.V. of 0.97. The solid particles were washed with hexane and dried to yield 10 grams of product with an I.V. of 0.40. A cast film from this product was clear, colorless, and slightly brittle.

EXAMPLE 11

This Example illustrates the preparation of a composition of the present invention employing styrene as the ethylenically unsaturated monomer.

The procedure of Example 1 was repeated except that styrene was substituted for ethyl acrylate. After the reaction mixture had been subjected to polymerization conditions for 21 hours, the reaction mixture was a milky fluid. The recovered product weighed 12.35 grams and produced a brittle, colorless film upon casting.

EXAMPLE 12

This Example illustrates the use of n-isopropylacrylamide in conjunction with butyl acrylate in the preparation of a composition of the present invention.

The procedure of Example 1 was repeated except that ethyl acrylate was replaced with 5 grams of n-isopropylacrylamide and 5 grams of butyl acrylate. After the reaction mixture had been subjected to polymerization conditions for 66 hours, the polymer was precipitated with hexane, washed, and dried to yield 18.04 grams of a clear, colorless, soft polymer having an I.V. of 0.65. A film cast from the polymer was clear, hard, colorless, and brittle.

EXAMPLE 13

This Example illustrates the use of vinyl acetate in the preparation of a composition of the present invention.

The procedure of Example 1 was repeated except that vinyl acetate was employed instead of ethyl acrylate. After 21 hours under polymerization conditions, the reaction mixture was a clear solution from which 11.4 grams of polymer was isolated. The polymer was cast to produce a colorless, clear, brittle film.

EXAMPLE 14

This Example illustrates the use of ethylene and vinyl acetate in the preparation of a composition of the present invention.

A mixture of 150 grams carboxylated cellulose acetate butyrate, 150 grams vinyl acetate, and 300 ml butyl acetate was provided to a 1 liter pressure vessel equipped with a stirrer. The reactor was heated to 70° C. and pressurized with 200 psig ethylene. The ethylene pressure was increased to 500 psig as the temperature was slowly raised to 90° C. After 8 hours at 90° C. the reactor was cooled and vented. The polymer was precipitated with hexane, washed, and dried. The product was clear, colorless, and weighed 191 grams. The I.V. of the product was 0.17.

The invention has been described in detail with particular reference to preferred embodiments thereof, but it will be understood that variations and modifications can be effected within the spirit and scope of the invention.

We claim:

1. A novel polymeric composition of matter comprising the reaction product of an ethylenically unsaturated monomer and a carboxylated cellulose ester having an acid number of at least about 5, an inherent viscosity of from about 0.01 to about 1.00 and wherein the anhydroglucose units thereof have ring substituents comprising by weight based on total polymer weight, of from about 0.05 to about 20% hydroxyl groups, from about 0.5 to about 44% acetyl groups, from 0 to about 54% butyryl groups, from 0 to about 47% propionyl groups, from about 0.4 to about 4.0% total carboxyl groups wherein from about 20% to about 100% of these carboxyl groups are non-saponifiable backbone, and wherein the material has a lactone level of from about $4.52 \times 10^{-5}$ to about $6.13 \times 10^{-4}$.

2. The composition of matter of claim 1 wherein said ethylenically unsaturated monomer comprises an olefin, a vinyl monomer, an acrylic monomer, an acrylamide, a methacrylamide, acrylonitrile, a vinyl-substituted heterocyclic compound, or a mixture thereof.

3. The composition of matter of claim 2 wherein said olefin comprises ethylene, propylene, 1,3-butadiene, isoprene, or a mixture thereof.

4. The composition of matter of claim 2 wherein said vinyl monomer comprises styrene, divinylbenzene, vinyltoluene, vinylnaphthalene, vinyl acetate, vinyl chloride, vinyl bromide, vinylidene chloride, vinylidene fluoride, tetrafluoroethylene, or a mixture thereof.

5. The composition of matter of claim 2 wherein said acrylic monomer comprises acrylic acid, methacrylic acid, methyl acrylate, ethyl acrylate, hydroxyethyl acrylate, phenoxyethyl acrylate, propyl acrylate, butyl acrylate, 2-ethylhexyl acrylate, glycidyl acrylate, ethylene glycol diacrylate, diethylene glycol diacrylate, 1,6- hexanediol diacrylate, trimethylolpropane triacrylate, pentaerythritol triacrylate, pentaerythritol tetraacrylate, methyl methacrylate, ethyl methacrylate, hydroxyethyl methacrylate, dimethylaminoethyl methacrylate, propyl methacrylate, butyl methacrylate, 2-ethylhexyl methacrylate, glycidyl methacrylate, ethylene glycol dimethacrylate, diethylene glycol dimethacrylate, triethylene glycol dimethacrylate, tetraethylene glycol dimethacrylate, trimethylolpropane trimethacrylate, bisphenol "A" dimethacrylate, or a mixture thereof.

6. The composition of matter of claim 2 wherein said acrylamide comprises acrylamide, N-methylacrylamide, N-ethylacrylamide, N-isopropylacrylamide, diacetone acrylamide, N-methylol acrylamide, or a mixture thereof.

7. The composition of matter of claim 2 wherein said methacrylamide comprises methacrylamide, N-methylmethacrylamide, N-ethylmethacrylamide, N-isopropylmethacrylamide, diacetone methacrylamide, N-methylol methacrylamide, or a mixture thereof.

8. The composition of matter of claim 2 wherein said vinyl-substituted heterocyclic compound comprises vinylpyridine, 1-vinyl-2-pyrrolidinone, or a mixture thereof.

9. The composition of matter of claim 1 wherein said carboxylated cellulose ester comprises carboxylated cellulose acetate, carboxylated cellulose propionate, carboxylated cellulose butyrate, carboxylated cellulose acetate propionate, carboxylated cellulose acetate butyrate, or a mixture thereof.

10. The composition of matter of claim 9 wherein said carboxylated cellulose ester comprises carboxylated cellulose acetate, carboxylated cellulose acetate propionate, carboxylated cellulose acetate butyrate, or a mixture thereof.

11. The composition of matter of claim 10 wherein said carboxylated cellulose ester comprises carboxylated cellulose acetate butyrate.

12. The composition of matter of claim 1 which comprises about 5 to 95 percent by weight of said carboxylated cellulose ester.

13. The composition of matter of claim 1 which comprises about 25 to 75 percent by weight of said carboxylated cellulose ester.

14. The composition of matter of claim 1 which comprises about 50 percent by weight of said carboxylated cellulose ester.

15. The composition of matter of claim 1 which further comprises a filler, dye, pigment, plasticizer, antioxidant, and/or stabilizer.

16. A novel composition of matter which comprises a graft copolymer which is the reaction product of about 5 to 95 percent by weight of an ethylenically unsaturated monomer comprising an acrylic monomer, an acrylamide, a methacrylamide, a vinyl monomer, or a mixture thereof and correspondingly about 5 to 95 percent by weight of a carboxylated cellulose ester having an acid number of at least about 5, an inherent viscosity of from about 0.01 to about 1.00 and wherein the anhydroglucose units thereof have ring substituents comprising by weight based on total polymer weight, of from about 0.05 to about 20% hydroxyl groups, from about 0.5 to about 44% acetyl groups, from 0 to about 54% butyryl groups, from 0 to about 47% propionyl groups, from about 0.4 to about 4.0% total carboxyl groups wherein from about 20% to about 100% of these carboxyl groups are non-saponifiable backbone, and wherein the material has a lactone level of from about $4.52 \times 10^{-5}$ to about $6.13 \times 10^{-4}$.

17. The composition of matter of claim 16 wherein said acrylic monomer comprises acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, or a mixture thereof.

18. The composition of matter of claim 16 wherein said acrylamide comprises acrylamide, N-methacrylamide, N-ethylacrylamide, N-isopropylacrylamide, diacetone acrylamide, N-methylol acrylamide, or a mixture thereof.

19. The composition of claim 16 wherein said methacrylamide comprises methacrylamide, N-methylmethacrylamide, N-ethylmethacrylamide, N-isopropylmethacrylamide, diacetone methacrylamide, N-methylol methacrylamide, or a mixture thereof.

20. The composition of matter of claim 16 wherein said ethylenically unsaturated monomer comprises an acrylic monomer.

21. The composition of matter of claim 16 wherein said carboxylated cellulose ester comprises carboxylated cellulose acetate butyrate.

22. The composition of matter of claim 16 which comprises about 50 percent by weight of said carboxylated cellulose ester.

23. The composition of matter of claim 16 which further comprises a filler, dye, pigment, plasticizer, antioxidant, and/or stabilizer.

24. A novel process for preparing graft copolymers, said process comprising reacting at polymerization temperature in the substantial absence of an additional initiator an ethylenically unsaturated monomer and a carboxylated cellulose ester having an acid number of at least about 5, an inherent viscosity of from about 0.01 to about 1.00 and wherein the anhydroglucose units thereof have ring substituents comprising by weight based on total polymer weight, of from about 0.05 to about 20% hydroxyl groups, from about 0.5 to about 44% acetyl groups, from 0 to about 54% butyryl groups, from 0 to about 47% propionyl groups, from about 0.4 to about 4.0% total carboxyl groups wherein from about 20% to about 100% of these carboxyl groups are non-saponifiable backbone, and wherein the material has a lactone level of from about $4.52 \times 10^{-5}$ to about $6.13 \times 10^{-4}$.

25. The process of claim 24 wherein said ethylenically unsaturated monomer comprises an olefin, a vinyl monomer, an acrylic monomer, an acrylamide, a methacrylamide, acrylonitrile, a vinyl-substituted heterocyclic compound, or a mixture thereof.

26. The process of claim 25 wherein said olefin comprises ethylene, propylene, 1,3-butadiene, isoprene, or a mixture thereof.

27. The process of claim 25 wherein said vinyl monomer comprises styrene, divinylbenzene, vinyltoluene, vinylnaphthalene, vinyl acetate, vinyl chloride, vinyl bromide, vinylidene chloride, vinylidene fluoride, tetrafluoroethylene, or a mixture thereof.

28. The process of claim 25 wherein said acrylic monomer comprises acrylic acid, methacrylic acid, methyl acrylate, ethyl acrylate, hydroxyethyl acrylate, phenoxyethyl acrylate, propyl acrylate, butyl acrylate, 2-ethylhexyl acrylate, glycidyl acrylate, ethylene glycol diacrylate, diethylene glycol diacrylate, 1,6-hexanediol diacrylate, trimethylolpropane triacrylate, pentaerythritol triacrylate, pentaerythritol tetraacrylate, methyl methacrylate, ethyl methacrylate, hydroxyethyl methacrylate, dimethylaminoethyl methacrylate, propyl methacrylate, butyl methacrylate, 2-ethylhexyl methacrylate, glycidyl methacrylate, ethylene glycol dimethacrylate, diethylene glycol dimethacrylate, triethylene glycol dimethacrylate, tetraethylene glycol dimethacrylate, trimethylolpropane trimethacrylate, bisphenol "A" dimethacrylate, or a mixture thereof.

29. The process of claim 25 wherein said acrylamide comprises acrylamide, N-methylacrylamide, N-ethylacrylamide, N-isopropylacrylamide, diacetone acrylamide, N-methylol acrylamide, or a mixture thereof.

30. The process of claim 25 wherein said methacrylamide comprises methacrylamide, N-methylmethacrylamide, N-ethylmethacrylamide, N-isopropylmethacrylamide, diacetone methacrylamide, N-methylol methacrylamide, or a mixture thereof.

31. The process of claim 25 wherein said vinyl-substituted heterocyclic compound comprises vinylpyridine, 1-vinyl-2-pyrrolidinone, or a mixture thereof.

32. The process of claim 24 wherein said carboxylated cellulose ester comprises carboxylated cellulose acetate, carboxylated cellulose propionate, carboxylated cellulose butyrate, carboxylated cellulose acetate propionate, carboxylated cellulose acetate butyrate, or a mixture thereof.

33. The process of claim 32 wherein said carboxylated cellulose ester comprises carboxylated cellulose acetate, carboxylated cellulose acetate propionate, carboxylated cellulose acetate butyrate, or a mixture thereof.

34. The process of claim 33 wherein said carboxylated cellulose ester comprises carboxylated cellulose acetate butyrate.

35. The process of claim 24 wherein said carboxylated cellulose ester is provided to the reaction system in an amount of about 5 to 95 percent by weight, based upon the total weight of the reactants.

36. The process of claim 24 wherein said carboxylated cellulose ester is provided to the reaction system in an amount of about 25 to 75 percent by weight, based upon the total weight of the reactants.

37. The process of claim 24 wherein said carboxylated cellulose ester is provided to the reaction system in an amount of about 50 percent by weight, based upon the total weight of the reactants.

38. The process of claim 24 wherein said polymerization temperature is about 10° to 250° C.

39. The process of claim 38 wherein said polymerization temperature is about 25° to 120° C.

40. A process according to claim 24 which is a bulk polymerization process.

41. A process according to claim 24 which is an emulsion polymerization process.

42. A process according to claim 24 which is a solution polymerization process.

43. The process of claim 24 wherein the reaction system further comprises an activator, a promoter, and/or an accelerator.

44. A novel process for preparing graft copolymers, said process comprising reacting about 25 to 75 percent by weight, based upon the total weight of the reactants, of a carboxylated cellulose ester with correspondingly about 25 to 75 percent by weight, based upon the total weight of the reactants, of an ethylenically unsaturated monomer comprising a vinyl monomer, an acrylamide, a methacrylamide, an acrylic monomer, or a mixture thereof at a temperature of about 25° to 120° C. in the substantial absence of an additional initiator, said carboxylated cellulose ester having an acid number of at least about 5, an inherent viscosity of from about 0.01 to about 1.00 and wherein the anhydroglucose units thereof have ring substituents comprising by weight based on total polymer weight, of from about 0.05 to about 20% hydroxyl groups, from about 0.5 to about 44% acetyl groups, from 0 to about 54% butyryl groups, from 0 to about 47% propionyl groups, from about 0.4 to about 4.0% total carboxyl groups wherein from about 20% to about 100% of these carboxyl groups are non-saponifiable backbone, and wherein the material has a lactone level of from about $4.52 \times 10^{-5}$ to about $6.13 \times 10^{-4}$.

45. The process of claim 44 wherein said carboxylated cellulose ester comprises carboxylated cellulose acetate butyrate.

46. The process of claim 44 wherein said carboxylated cellulose ester is provided to the reaction system in an amount of about 50 percent by weight, based upon the total weight of the reactants.

47. The process of claim 44 wherein said ethylenically unsaturated monomer comprises an acrylic monomer.

48. The process of claim 47 wherein said acrylic monomer comprises acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, or a mixture thereof.

49. A process according to claim 44 which is a bulk polymerization process.

50. A process according to claim 44 which is a solution polymerization process.

51. A process acording to claim 44 which is an emulsion polymerization process.

52. The process of claim 44 wherein the reaction system further comprises an activator, a promoter, and/or an accelerator.

* * * * *